May 16, 1950

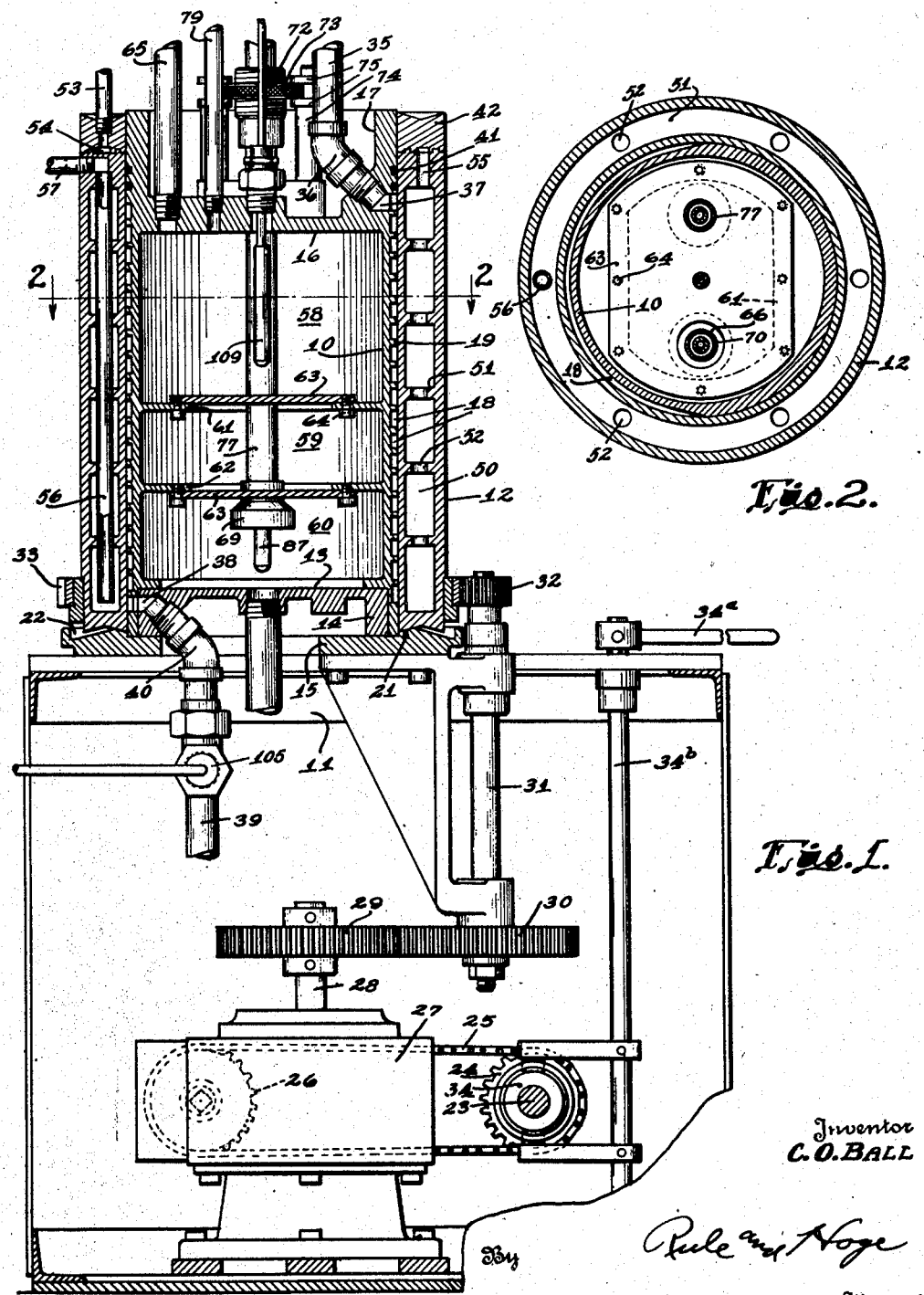

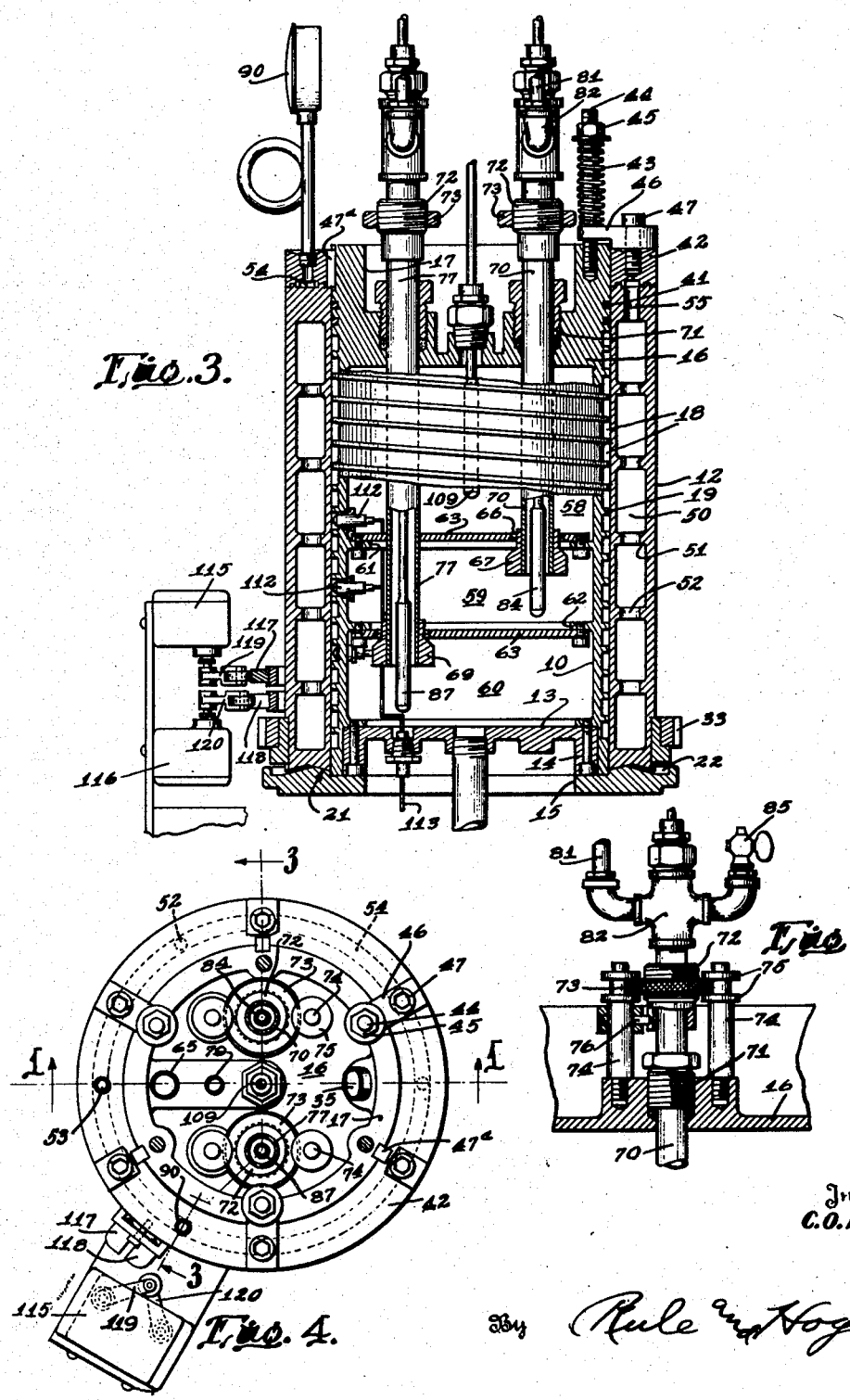

C. O. BALL 2,508,212

APPARATUS FOR HEAT-TREATING AND
STERILIZING LIQUID FOODS

Filed Dec. 28, 1946

Inventor
C. O. BALL

By Rule and Hoge.
Attorneys

Patented May 16, 1950

2,508,212

UNITED STATES PATENT OFFICE 2,508,212

APPARATUS FOR HEAT-TREATING AND STERILIZING LIQUID FOODS

Charles O. Ball, Maumee, Ohio, assignor to Owens-Illinois Glass Company, a corporation of Ohio Application December 28, 1946, Serial No. 719,004

11 Claims. (Cl. 257—3)

My invention relates to apparatus adapted for heating and sterilizing liquid and semi-liquid foods, such as dairy products, puree foods, cream style corn, and the like, by passing the foods through channels, the walls of which are heated by means of steam or hot water. The apparatus is also adaptable to pasteurization processes.

The invention provides an apparatus suitable for high temperature, short time sterilization of foods. In order to realize the full benefits of preservation of the quality of the product, the food must be treated continuously in such a manner as to heat it quickly to a high sterilizing temperature and to cool it quickly after it is sterilized.

The present invention provides a heating and sterilizing apparatus of a type comprising a channel or channels enclosed within an annular space between concentric hollow cylinders, the channel or channels preferably extending spirally from near one end of the cylinders to the other. An objection which has heretofore been found in the use of a construction of this general type relates to the inaccessibility of the channels for cleaning purposes and the tendency of food products to adhere to or be burned onto the channel walls. An object of the present invention is to overcome this difficulty, and to this end the invention provides a construction in which the outer cylinder provides an outer wall surface of the spiral channel, the cylinder being removable to give complete access to said channel for cleaning purposes.

A further object of the invention is to provide means for overcoming the tendency of "burned on" milk solids or particles of other foods to accumulate, particularly in the minute crevices between the inner wall surface of the outer cylinder and the abutting surfaces of the channel walls forming part of the inner cylinder, particularly as such accumulations impart an objectionable flavor to the fluid product passing through the channel. To avoid this effect, the present invention provides means for rotating the outer cylinder while the inner cylinder remains stationary, thereby preventing such accumulations and at the same time, retaining the advantages of compactness and facility of cleaning.

A further feature of the invention relates to the form of the spiral channel which is preferably substantially rectangular in cross section which provides more rapid heating of the contents per unit of cross sectional area, and also produces greater turbulence in the liquid passing through it, than is obtained in the use of a channel or tube of circular cross section.

Other objects of the invention and novel features of construction will appear more fully hereinafter.

Referring to the accompanying drawings:

Fig. 1 is a sectional elevation of a heating and sterilizing apparatus constructed in accordance with my invention, parts being broken away, the section being at the line 1—1 on Fig. 4;

Fig. 2 is a section through the concentric cylinders at the line 2—2 on Fig. 1;

Fig. 3 is a sectional elevation at the line 3—3 on Fig. 4;

Fig. 4 is a top plan view of the cylinders and appurtenances, some of the piping being shown in section;

Fig. 5 is a detail view in part sectional elevation, showing an adjustable mounting for a valve stem;

Figures 6, 7:
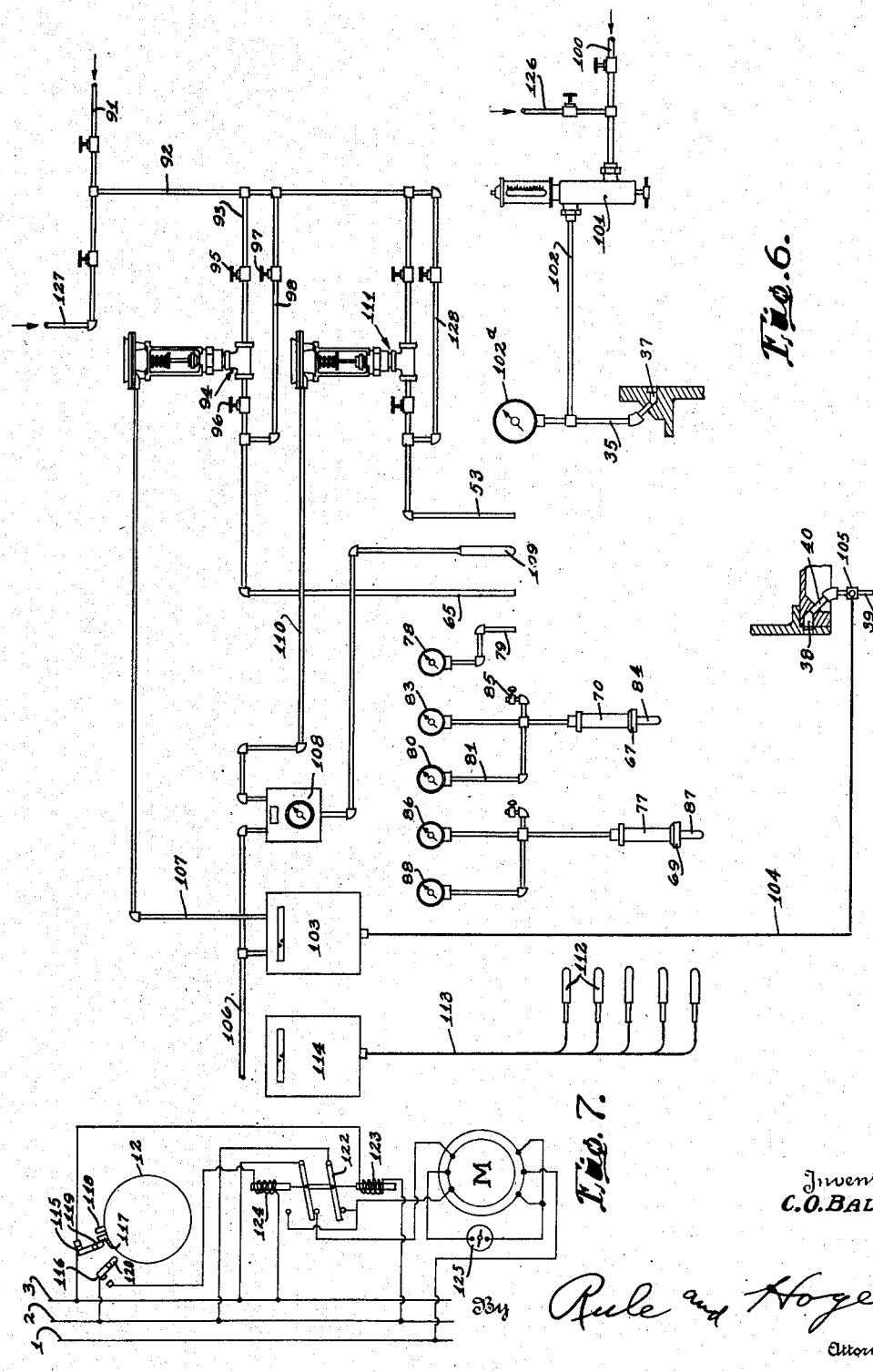
Fig. 6 is a diagrammatic view of the steam, water and air system with its various indicators and control devices.
Fig. 7 is a diagrammatic view of the electric motor and its controls.

Referring to Fig. 1, the apparatus comprises an inner stationary drum or hollow cylinder 10 supported on a framework 11, and an outer rotatable cylinder 12 surrounding and concentric with the stationary cylinder. The lower end of the cylinder 10 is closed by a head plate 13 formed with a downwardly extended marginal flange 14 which rests on a stationary annular plate 15 mounted on the frame 11. The cylinder 10 is provided with an upper head plate 16 integral with the cylindrical wall of the drum and formed with an upwardly extending marginal portion 17 which forms an extension of the cylindrical wall.

Between the inner and outer cylinders there is provided one or more spiral channels 18, through which the liquid food products are conveyed spirally downward during the processing. The walls of the channel 18, which is preferably rectangular in cross section, are formed in part by a spiral rib 19 or thread formed on the cylinder 10, the vertical walls of the channel being formed by the spaced walls of the cylinders. The inner face of the outer cylinder 12 bears against the spiral rib 19.

The annular base plate 15 has a machined bearing surface 21 which forms a bearing support for the rotating cylinder 12. The plate 15 is formed with an annular trough 22 to receive any liquid which may leak past the bearing 21. Any such leakage may be carried off by a drain pipe (not shown). The cylinder 12 is rotated by an electric motor M (Fig. 7) having driving connections with the cylinder through a train of gearing including a power shaft 23 (Fig. 1) which drives a sprocket wheel 24, chain 25, and sprocket wheel 26. The latter is connected through gearing in a gear box 27 in a shaft 28. Intermeshing gears 29 and 30 are mounted respectively, on the shaft 28 and a shaft 31 to which is keyed a pinion 32 running in mesh with a ring gear 33 on the lower end of the cylinder 12. The power shaft 23 is connected to the gear 24 through a clutch 34, the clutch operating means comprising a hand lever 34ª and a rock shaft 34ᵇ.

The liquid food or material to be processed is conveyed to the spiral channel through a pipe 35 (Fig. 1) connected through a coupling 36 to the head plate 16, the latter having a port 37 at the upper end of the spiral channel. The lower end of the channel 18 opens into a port 38 in the lower head plate 13, and the liquid is conveyed from said port to a pipe 39 connected by a coupling 40 to the plate 13. The inlet port 37 is spaced a short distance above the steam chamber within the stationary cylinder so that the heating medium contained within the cylinder will not act directly upon the upper part of the spiral channel. The top seal between the inner and outer cylinders 10 and 12 to prevent leakage of food is maintained by a series of piston rings 41 located above the heated portion of thte cylinder 10 so that the food will not "burn on" around the rings.

A stationary bearing ring 42 is mounted above the rotating cylinder 12 and bears downward with a yielding pressure on the cylinder. Means for supplying such pressure comprises coil springs 43 (Fig. 3) mounted on posts or rods 44 which may be positioned at intervals circumferentially of the cylinder, said rods being threaded into the head flange 17 of the stationary cylinder. The springs are held under compression between the nuts 45 threaded on the rods and lugs 46 attached by screw bolts 47 to the bearing ring 42, said rods passing loosely through openings in the lugs 46. The pressure of the springs is adjustable by adjusting the nuts 45. The construction just described provides means by which the outer rotating cylinder is removably mounted. By removing the nuts 45 or the rods 44, or by removing the bolts 47 and swinging the members 46 away from the bearing ring 42, the ring and cylinder 12 may be lifted vertically to completely expose the spiral channel 18 permitting it to be readily cleaned. The bearing ring 42 is held against rotation with the outer cylinder by a spline connection 47ª between the ring and stationary cylinder.

The outer cylinder 12 is formed with inner and outer cylindrical walls spaced to provide a steam chamber 50 within which steam is circulated. A series of annular webs 51 positioned at intervals lengthwise of the cylinder, bridge the space between the cylinder walls and serve to give the cylinder strength and rigidity, holding the inner wall in contact with the spiral rib 19 and preventing any yielding movement under pressure of the material within the spiral channel. Each of the webs 51 is formed with openings 52 therethrough to permit the free movement of the steam downward through the cylinder. These openings are aligned in vertical rows.

Steam under pressure is supplied to the cylinder 12 through a pipe 53 (Fig. 1) connected to the bearing ring 42 and opening into an annular channel 54 formed in the lower face of the ring and communicating with channels 55 extending downward to the steam chamber 50. The exhaust steam or condensate is discharged from the lower end of the cylinder 12 upwardly through a vertical drain pipe 56 and pipe 57 (Fig. 1). The pipe 56 extends from the pipe 57 downward through one of the aforementioned rows of aligned openings 52 and terminates near the bottom of the steam chamber 50.

The interior of the stationary cylinder 10 is divided into a plurality of sections or individual chambers, the number of which may vary according to requirements. As shown on the drawings, the cylinder is divided into three sections, namely, an upper section 58, an intermediate section 59, and a lower section 60. These sections are separated by upper and lower partitions 61 and 62. As shown, each said partition comprises an annular flange portion integral with the cylinder and a plate 63 removably attached thereto by bolts 64. Steam under pressure is admitted to the upper chamber 58 through a pipe 65 which is threaded into an opening extended through the head plate 16. Steam from the upper chamber 58 is admitted to the intermediate chamber 59 through an annular passageway 66 (Fig. 3) formed by a circular opening in the plate 63 and a tapered valve 67 extending through said opening concentric therewith and adjustable up and down for adjustably varying the size of the passageway 66. Steam is in like manner conveyed from the intermediate chamber 59 into the lower chamber 60 through an opening in the lower partition 62 restricted by a valve 69 similar to the valve 67.

The valve 67 is attached to the lower end of a vertical tube 70 which is open at its lower end and extends upwardly through an opening in the head plate 16, being sealed therein by a packing gland 71. The tube 70 is adjustable up and down for adjusting the valve 67, by means of the following construction shown in Figs. 3, 4, and 5. An exteriorly threaded sleeve 72 is fixed on the tube 70 above the cylinder head. A knurled adjusting ring or nut 73 is threaded for rotation on the sleeve 72 and is held against up-and-down movement relative to the steam cylinder by a pair of posts 74 attached to the cylinder head and formed with collars 75 which embrace the ring 73. Rotation of the sleeve 72 and tube 70 is prevented by a stud 76 attached to one of the posts 74 and engaging a vertical slot in the sleeve 72. The valve 67 is adjustable up and down by rotating the ring 73. An identical construction is provided for adjusting the lower valve 69 up and down, said valve being attached to the lower end of a tube 77 which extends upwardly through an opening in the upper partition 61.

The steam pressure within the upper chamber 58 is indicated by a steam pressure gauge 78 (Fig. 6) which communicates through a pipe 79 (Fig. 1) with the chamber 58. The steam pressure in the intermediate chamber 59 is indicated by a steam pressure gauge 80 communicating with said chamber through a pipe 81 (Figs. 5 and 6) which is connected through a union 82 with the tube 70 leading to said central chamber 59. The temperature of the steam in the chamber 59 is indicated by a dial thermometer 83 having a thermometer bulb 84 which may extend downward into the chamber 59 or may be located at any desired position vertically within the tube 70. A restricted upward flow of steam through the tube 70 is permitted by means of a venting petcock 85 (Fig. 5) connected to the union 82, thereby permitting the gauges 80 and 83 to indicate accurately the steam pressure and temperature within the chamber 59. The temperature within the lower chamber 60 is indicated by a dial thermometer 86 connected to a thermometer bulb 87 located at any desired point within the tube 77. The steam pressure in the lower chamber is indicated by a steam pressure gauge 88. The steam pressure of the steam entering the outer rotating cylinder is indicated by a steam pressure gauge 90 (Fig. 3) mounted on the bearing ring 42.

Referring to Fig. 6, steam under pressure is admitted to the heating system through a steam inlet pipe 91, the steam line extending through pipes 92, 93 and the pipe 65 to the upper steam chamber 58. An air-operated diaphragm valve 94 in the pipe line is automatically operated as hereinafter described under the control of the temperature at the food outlet pipe 39 (Figs. 1 and 6). Hand operated valves 95 and 96 at opposite sides of the valve 94 may be closed and a valve 97 in a by-pass pipe 98 may be opened for admitting steam directly to the upper stationary cylinder as may be desired for warming up the apparatus and during adjustment of the various temperature, pressure and other control devices preparatory to processing a food product.

The liquid food to be processed is supplied through a food inlet pipe 100, the food line extending through a flow meter 101 which indicates the rate of flow, and pipe 102 to the aforementioned pipe 35 leading to the upper end of the spiral channel 18. The pressure of the liquid entering the channel 18 is indicated by a gauge 102ª. The temperature of the liquid at the food outlet 39 is indicated and recorded by a temperature recorder and controller indicated diagrammatically at 103 which is connected through a wire 104 with a thermocouple element 105 in the food outlet pipe 39. Air under pressure is supplied through a pipe 106 to the controller 103 which operates automatically to supply air under pressure to a pipe 107, the air supply to the pipe 107 being regulated and controlled by the temperature at the thermocouple 105. Pipe 107 leads to the air-operated valve 94 and operates the latter automatically to regulate the steam supply to the cylinder chamber 58 and maintain a substantially constant temperature at the food outlet.

A temperature recorder controller 108 is connected to a thermometer bulb 109 in the steam chamber 58. Air pressure is supplied through the pipe 106 to the controller 108 and from said controller through a pipe 110 to an air-operated diaphragm valve 111 which is constructed and operated in the same manner as the valve 94 and operates automatically to control the steam supply through the pipe 53 to the outer steam cylinder for maintaining a substantially constant steam pressure in the cylinder.

The temperature of the liquid which is being processed is indicated by means of a series of wall thermocouples 112 (Figs. 3 and 6) which are positioned at intervals along the spiral channel 18. The wires leading from the thermocouples are extended in a cable 113 to a multiple point temperature recorder 114 which indicates and records the temperatures at the different points at which the thermocouples are located. As shown on Fig. 3, there is a thermocouple positioned in the chamber wall of each of the steam chambers 58, 59 and 60 thus indicating temperatures at these points so that adjustments may be made to meet the particular temperature requirements of the material which is being processed.

During operation, the outer cylinder 12 may be rotated continuously but I have found that under certain conditions, it is desirable to intermittently rotate the cylinder alternately in opposite directions which serves to effectively prevent any accumulation of food products or particles that might otherwise become lodged in the minute spaces or crevices between the contacting surfaces of the stationary and rotary cylinders. Accordingly, I have provided automatic means for periodically reversing the driving motor M. Such means includes limit switches 115 and 116 (Figs. 3, 4 and 7) which have a stationary mounting, one above the other. The switches 115 and 116 are provided with switch arms 119 and 120 which extend into the path of dogs 117 and 118 respectively, mounted on the rotating cylinder 12.

The motor M is driven by current supplied from the mains 1, 2 and 3 of a three-phase system. The direction of rotation is controlled by a reversing switch 122 which is operated by electromagnets 123 and 124 in circuit respectively, with the limit switches 115 and 116.

Assuming the parts to be in the position shown in Fig. 7 in which the limit switch 115 has been closed by the dog 117, the motor may be started by closing the starting switch 125. The motor then rotates the cylinder 12 in a clockwise direction until the dog 118 engages the switch arm 120 and closes the limit switch 116. This supplies current to the reversing switch magnet coil 124, thereby throwing the switch and reversing the motor so that the latter rotates the cylinder 12 in the opposite or counter-clockwise direction until the dog 117 again closes the switch 115, thus energizing the reversing switch magnet 123 and operating the reversing switch. By adjusting the relative positions of the dogs 117 and 118 circumferentially of the cylinder, the extent of the periodic rotations or oscillations of the cylinder may be adjusted as desired. The dogs may readily be removed from the cylinder when it is desired to run the motor continuously in one direction.

Referring to Fig. 6, water may be supplied to the food line through a pipe 126 as may be desired for flushing and cleaning the food line or spiral channel. Hot water may be used for heating the channel walls preparatory to processing a food product. Water may also be supplied to the steam chambers of the cylinders 10 and 12 through a pipe 127 for heating the apparatus preliminary to a processing operation or for other purposes. For example, hot water may be supplied and conveyed through the by-pass 98 as heretofore noted, to the upper chamber 58 of the stationary cylinder and may also be supplied through the pipe 92 and a by-pass pipe 128 and pipe 53 to the chamber 50 of the rotating cylinder.

Modifications may be resorted to within the spirit and scope of my invention.

I claim:

1. Apparatus for heat-treating liquid foods and the like, comprising a hollow cylinder with end walls, means forming a spiral channel extending along the cylindrical wall of the cylinder, a partition within the cylinder dividing it into separate steam chambers, means for supplying steam under pressure to one said chamber, said partition being formed with an aperture therethrough for the passage of steam from one chamber to the other, a tapered valve located at said aperture and restricting the size thereof, a valve stem connected to said valve and extending through an end wall of the cylinder, and valve adjusting means connected to said stem and operable to adjust the position of the valve and thereby adjustably vary the size of said restricted aperture.

2. Apparatus for processing liquid foods and the like, said apparatus comprising a hollow cylinder, head plates closing the ends of the cylinder, a support on which the cylinder has a stationary mounting, a spiral rib formed on the exterior surface of the cylinder and extending substantially throughout the length of the cylinder between said head plates, an outer tubular cylinder surrounding the inner cylinder and mounted concentrically therewith, means for rotating the outer cylinder, the inner wall of said outer cylinder being in rotative contact with the said rib throughout the length of the latter and forming with said rib and inner cylinder, a spiral channel, transverse partition walls in the inner cylinder positioned one above another and dividing the interior of the cylinder into a plurality of steam chambers, means providing restricted openings through said partitions, means for adjusting the effective sizes of said openings, means for introducing steam under pressure into the upper said chamber, means for conveying exhaust steam and condensate from the lower chamber, said outer cylinder being formed to provide a steam chamber extending substantially throughout its length and surrounding the inner cylinder, means for introducing steam under pressure into the upper end of the outer cylinder and causing it to circulate through said chamber of the outer cylinder, means for conducting the exhaust steam and condensate from the lower end of said outer cylinder, and means for introducing liquid food to the upper end of said spiral channel and conducting it from the lower end of the channel away from the cylinders.

3. An apparatus as defined in claim 1, in which the valve adjusting means comprises an adjusting ring screw-threaded on the valve stem exteriorly of the cylinder and rotatable on the valve stem, and means for holding the adjusting ring against movement toward or from the cylinder when rotated, whereby rotation of the ring causes adjustment of the valve.

4. Apparatus for heat-treating liquid foods and the like, comprising a hollow cylinder with end walls, a partition within the cylinder dividing it into separate steam chambers, means for supplying steam under pressure to one said chamber, said partition being formed with an aperture therethrough for the passage of steam from one chamber to the other, a valve in said aperture, means for adjusting the valve and thereby adjusting the size of said aperture, said valve adjusting means comprising a tubular valve stem attached to the valve and opening at one end into the said steam chamber, said stem being extended through an opening in a wall of the cylinder, and a temperature gauge connected to said stem outside of said cylinder and comprising a temperature bulb positioned within the said tubular stem.

5. Apparatus for heat-treating liquid foods and the like, comprising a hollow cylinder with end walls, a partition within the cylinder dividing it into separate steam chambers, means for supplying steam under pressure to one said chamber, said partition being formed with an aperture therethrough for the passage of steam from one chamber to the other, a valve in said aperture, means for adjusting the valve and thereby adjusting the size of said aperture, said valve adjusting means comprising a tubular valve stem attached to the valve and opening at one end into the said steam chamber, said stem being extended through an opening in a wall of the cylinder, a temperature gauge connected to said stem outside of said cylinder and comprising a temperature bulb positioned within the said tubular stem, a steam pressure gauge connected to said valve stem, and means for venting said valve stem and permitting a restricted flow of steam for supplying to the gauges the temperature and pressure within the steam chamber.

6. Apparatus for heat-treating liquids and the like, comprising a hollow cylinder, means providing a stationary mounting for the cylinder and holding the latter with its axis vertical, an outer rotary cylinder surrounding said stationary cylinder and concentric therewith, means cooperating with the cylinders to provide a spiral channel between and extending spirally lengthwise of the cylinders, said outer cylinder comprising inner and outer concentric cylindrical walls spaced to form a chamber therebetween, a stationary bearing ring surmounting the outer cylinder, a steam pipe connected to the bearing ring, said steam ring and outer cylinder being formed with communicating channels providing communication between said steam pipe and the steam chamber, means for rotating said outer cylinder, and means for supplying steam under pressure to the interior of said stationary cylinder.

7. The combination of a hollow inner cylinder, an outer cylinder surrounding and concentric with the inner cylinder, the outer cylindrical wall of the inner cylinder and inner wall of the outer cylinder being spaced apart, a spiral rib formed on one of said cylinder walls and bridging the space between the cylinders and thereby forming with the cylinder walls a spiral channel extending lengthwise of the cylinders, a motor, gearing connecting the motor with the outer cylinder for rotating the latter, and automatic means actuated by said outer cylinder when it reaches predetermined rotative positions for periodically reversing the direction of rotation of said outer cylinder.

8. The combination of a hollow inner cylinder, an outer cylinder surrounding and concentric with the inner cylinder, the outer cylindrical wall of the inner cylinder and inner wall of the outer cylinder being spaced apart, a spiral rib formed on one of said cylinder walls and bridging the space between the cylinders and thereby forming with the cylinder walls a spiral channel extending lengthwise of the cylinders, an electric motor, power transmission gearing between the motor and one of said cylinders for rotating the latter, a reversing switch in circuit with the motor, limit switches controlling the reversing switch, and means connected to the rotating cylinder for periodically actuating the limit switches in alternation and thereby periodically reversing the motor and the direction of rotation of the cylinder.

9. Apparatus for heat-treating liquid foods and the like, comprising a hollow cylinder with end walls closing the cylinder, means forming a spiral channel extending along the cylindrical wall of the cylinder from one said end wall to the other, a diaphragm within the cylinder between said end walls and forming a partition dividing the cylinder into relatively high and low pressure chambers, means for supplying steam under pressure to said high pressure chamber and maintaining steam at superatmospheric pressure therein, said partition being formed with an aperture therethrough for the passage of steam from the high pressure chamber to the low pressure chamber, a valve in said aperture restricting the flow of steam and thereby maintaining a materially higher pressure and temperature within the high pressure chamber than in the low pressure chamber, whereby the material in the portion of said channel extending along the wall of the high pressure chamber is subjected to a higher temperature than the material in the portion of the channel along the low pressure chamber, and means for adjusting the valve and thereby adjusting the size of said aperture.

10. Apparatus for heat-treating liquid foods and the like, comprising a hollow cylinder with end walls, means forming a channel exterior to the cylinder and extending in a circuitous path along the cylindrical wall of the cylinder from one said end wall to the other, a partition within the cylinder dividing it into separate chambers including a pressure chamber and a second chamber, means for supplying steam under pressure to said pressure chamber and maintaining steam at superatmospheric pressure therein, said partition being formed with an aperture therethrough for the passage of steam from said pressure chamber to the second chamber, means for exhausting the steam from the second chamber, means comprising a throttle valve in said aperture for throttling the flow of steam from the pressure chamber to the second chamber, whereby the pressure and temperature are maintained at a higher degree in the pressure chamber than in said second chamber, thereby subjecting the portion of the said channel extending along the wall of the pressure chamber to a higher temperature than the portion of the channel extending along the wall of said second chamber, and means for adjusting the valve and thereby adjusting the size of said aperture.

11. Apparatus for processing liquid foods and the like, said apparatus comprising a hollow cylinder, head plates closing the ends of the cylinder, a support on which the cylinder has a stationary mounting, a spiral rib formed on the exterior surface of the cylinder and extending substantially throughout the length of the cylinder between said head plates, an outer tubular cylinder surrounding the inner cylinder and mounted concentrically therewith, means for rotating the outer cylinder, the inner wall of said outer cylinder being in rotative contact with the said rib throughout the length of the latter and forming with said rib and inner cylinder, a spiral channel, transverse partition walls in the inner cylinder positioned one above another and dividing the interior of the cylinder into a plurality of steam chambers, means providing restricted openings through said partitions, means for adjusting the effective sizes of said openings, means for introducing steam under pressure into the upper said chamber, means for conveying exhaust steam and condensate from the lower chamber, and means for introducing liquid food to the upper end of said spiral channel and conducting it from the lower end of the channel away from the cylinder.

CHARLES O. BALL.

REFERENCES CITED

The following references are of record in the file of this patent:

UNITED STATES PATENTS

| Number | Name | Date |
|---|---|---|
| 634,950 | Miller | Oct. 17, 1899 |
| 733,604 | Sturges | July 14, 1903 |
| 801,344 | Sturges | Oct. 10, 1905 |
| 846,379 | Ambrose et al. | Mar. 5, 1907 |
| 967,503 | Davis | Aug. 16, 1910 |
| 1,305,833 | Pfouts | June 3, 1919 |
| 1,639,051 | Munday | Aug. 16, 1927 |
| 1,854,619 | Mortensen | Apr. 19, 1932 |
| 1,973,752 | Faust | Sept. 18, 1934 |